United States Patent [19]

Bawa

[11] 3,747,960
[45] July 24, 1973

[54] COUPLING
[75] Inventor: Jaspal S. Bawa, Elizabeth, N.J.
[73] Assignee: Thomas & Betts Corporation, Elizabeth, N.J.
[22] Filed: May 15, 1972
[21] Appl. No.: 253,157

[52] U.S. Cl. ............... 285/39, 285/55, 285/332.2, 285/334.4, 285/354, 285/423
[51] Int. Cl. ............................................. F16l 19/00
[58] Field of Search ............ 285/354, 332.3, 334.4, 285/332.2, 379, 39, 55, 423

[56] References Cited
UNITED STATES PATENTS

| 3,207,537 | 9/1965 | Kimbrell et al. | 285/379 X |
| 1,936,552 | 11/1933 | Goss | 285/354 |
| 896,204 | 8/1908 | Glauber | 285/354 X |
| 3,501,171 | 3/1970 | Baron | 285/334.4 X |
| 2,438,529 | 3/1948 | Woodling | 285/354 X |

FOREIGN PATENTS OR APPLICATIONS

| 1,172,566 | 12/1969 | Great Britain | 285/354 |

Primary Examiner—Thomas F. Callaghan
Attorney—David Teschner et al.

[57] ABSTRACT

A coupling positionable intermediate the threaded end of a pipe or fitting and a threaded opening where, for example, the manipulation of such pipe or fitting is either limited or restricted in such manner as to prevent direct coupling to the threaded opening. An internally threaded gland nut having a selectively tapered interior portion is rotatably connected to the externally threaded portion of a body member having a selectively tapered external portion spaced from the gland nut tapered portion to provide a selectively formed annular chamber within which is disposed a resilient seal means in the form of an annular ring. Both the seal means and the body member tapered portion are proportioned for contacting engagement with a leading edge of the threaded pipe or fitting advanced into the coupling to provide a controlled seal between the coupling and the fitting or pipe. The gland nut and body member, or selective portions thereof, may be formed of plastic or metallic material, the latter providing means for establishing a metal-to-metal contact and grounding path between the pipe or fitting and the coupling.

16 Claims, 9 Drawing Figures

COUPLING

BACKGROUND OF THE INVENTION

1. Field of the Invention

The invention is directed to the field of couplings and principally to an improved device for joining a threaded pipe or fitting to a threaded opening.

2. Description of the Prior Art

It is often necessary in both electrical and non-electrical applications to join the threaded end of a pipe or fitting to a threaded opening in an enclosure or similar supportive member. In many cases the manipulation of the threaded fitting or pipe to effect a joint with the enclosure or supportive member is rendered either extremely difficult or highly inconvenient either because of the limited space available, the size of the fitting or pipe, or because of prior assembly procedures which have rendered the pipe or fitting non-rotatable. Various prior art devices adapted to provide an intercoupling in such instances, although effective to provide some form of intercoupling, generally lack the means either to provide a necessary seal between the mating parts, or reliable metallic continuity to the enclosure or supportive member where, for example, a ground connection is necessary or desirable. In other prior art devices where a sealing means of one form or another is provided, such seals may be subjected to uncontrolled deformation or distortion whereby the coupling and seal associated therewith are rendered either ineffective or non-reusable upon the disassembly and re-assembly of the coupling device.

SUMMARY OF THE INVENTION

The invention overcomes the limitations noted above with respect to prior art devices by providing a reusable, easily manipulable coupling which is more effective, convenient, and reliable than such prior art devices and which may be utilized to provide both sealing and grounding in a single operation. The coupling comprises essentially three parts including a body member, a gland nut rotatably coupled thereto, and seal means in the form of a generally resilient annular ring positioned between opposing tapered surfaces formed respectively on the interior surface of the gland nut and the exterior surface of one end of the body member, the other end of which is externally threaded for mating engagement with a complementarily threaded opening in an enclosure or supportive member. An internally threaded portion generally adjacent one end of the gland nut is adapted to engage the threaded end of a fitting or pipe to which the coupling is to be joined, the other end of the gland nut being swaged, crimped or otherwise selectively inturned to at least partially encompass a circumferentially disposed raised portion on the body member to provide rotatable coupling therebetween. Thus, as the gland nut is rotated, the threaded end of the pipe or fitting is advanced towards the body member and into contacting engagement with both the seal means and the body member tapered portion which is arranged to provide a limit or stop for the advancing pipe or fitting end, thereby controlling the degree of deformation to which the seal means is subjected. The body member may be formed either of plastic or metallic material, or composite thereof, whereby in the former embodiment a metallic sleeve may be interposed within the interior of the body member to provide insulation about the metal-to-metal contact between the interior metallic sleeve of the body member and the threaded pipe or fitting engaged therewith. The tapered portions of both the gland nut and the body member may be selectively angularly oriented and the spacing therebetween so choosen as to control, limit, and regulate the deformation of the seal means during assembly. It is therefore an object of this invention to provide an improved coupling.

It is a further object of this invention to provide means for sealably securing a threaded fitting or pipe to an enclosure or supportive member.

It is another object of this invention to provide means for coupling a restrictively manipulable threaded fitting or pipe to a threaded opening in a support member or enclosure.

It is yet another object of this invention to provide means for sealably joining a restrictively manipulable threaded fitting or pipe to a threaded opening in an enclosure or support member.

It is still another object of this invention to provide both sealing and grounding means in a coupling for joining a threaded pipe or fitting to an enclosure or support member.

It is a further object of this invention to provide a coupling having selectively tapered portions arranged to control, limit, and regulate the deformation of a seal means interposed between the surfaces thereof.

Other objects and features of the invention will be pointed out in the following description and claims and illustrated in the accompanying drawings, which disclose by way of example, the principal of the invention and the best modes contemplated for carrying it out.

BRIEF DESCRIPTION OF THE DRAWINGS

In the Drawings.

Similar elements are given similar reference characters in each of the respective drawings.

DESCRIPTION OF THE PREFERRED EMBODIMENTS

Figure 1:
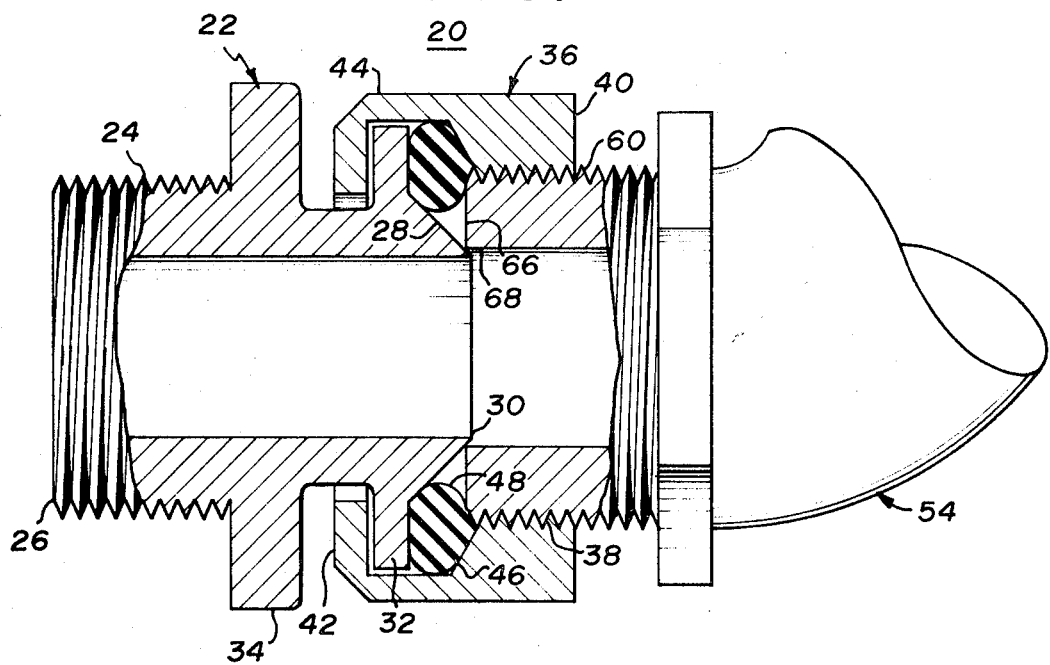
FIG. 1 is a cut away side elevational view, partly in section, of a coupling constructed in accordance with the concepts of the invention and joined to the threaded end of a fitting.
Figure 2:
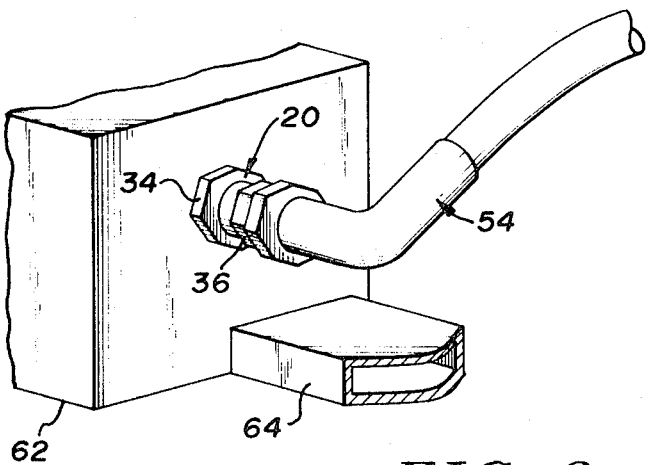
FIG. 2 is a perspective view, partly in section, illustrating a manner of use of the device of FIG. 1.
Figure 8:
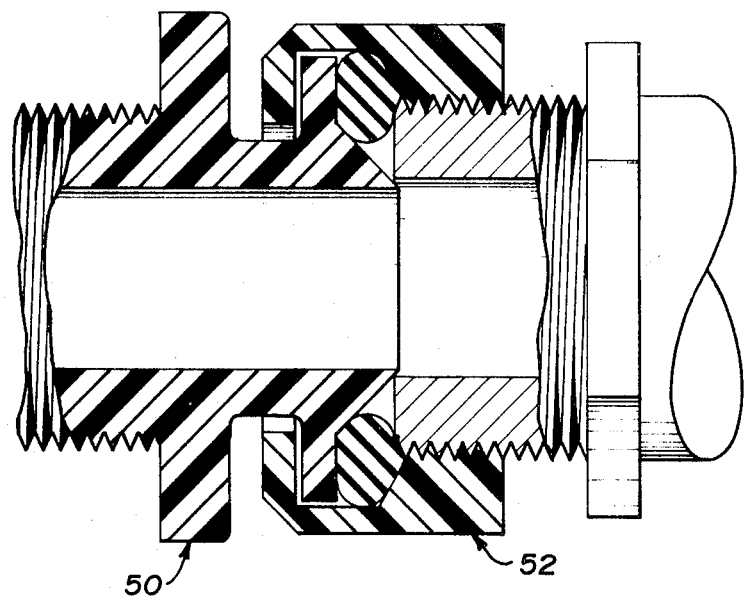
FIG. 8 is a cut away side elevational view, partially in section, of a further embodiment of a coupling constructed in accordance with the concepts of the invention.
Figure 9:
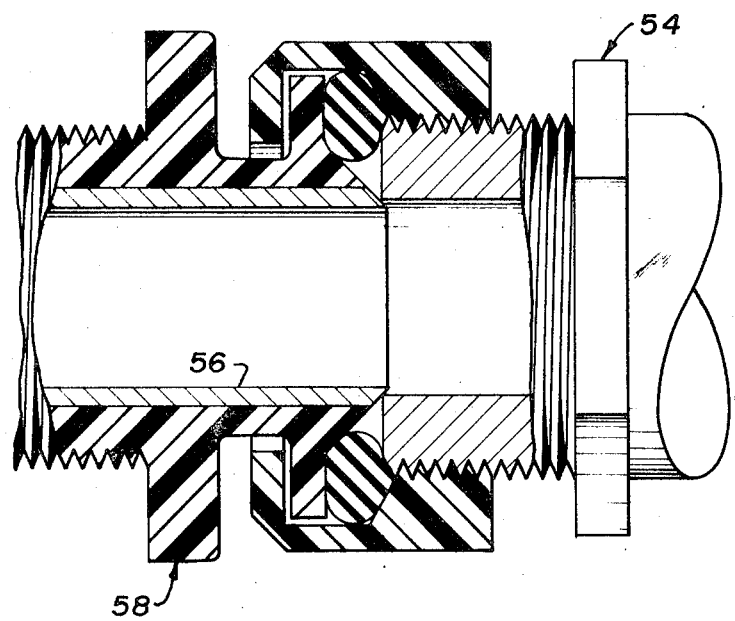
FIG. 9 is a cut away side elevational view, partially in section, of still another embodiment of a coupling constructed in accordance with the concepts of the invention.
Figure 5:
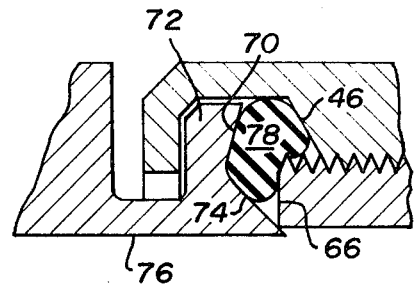
FIGS. 5 and 6 are fragmentary side elevational views, in section, of further embodiments of the tapered portions of the body member and gland nut of the device of FIG. 1 constructed in accordance with the concepts of the invention.
Figure 6:
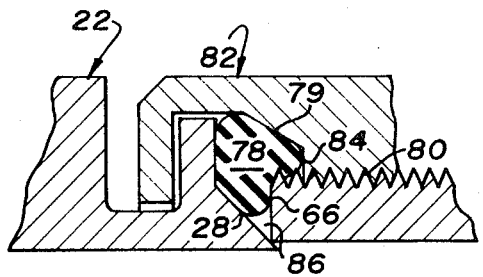

Turning now to FIG. 1 there is shown a coupling 20 constructed in accordance with the concepts of the invention. The coupling 20 comprises a body member 22 having an externally threaded portion 24 generally adjacent a first end 26 thereof, and an externally selectively tapered portion 28 generally adjacent a second end 30 thereof. Circumferentially disposed about the body member 22 and adjacent its tapered portion 28 is a raised portion 32. Spaced from the raised portion 32 intermediate the ends 26 and 30 is a circumferentially disposed shoulder 34 which may be either knurled, selectively flatted, or otherwise appropriately configured to provide a convenient means for manipulating the body member 22 for insertion into or removal from, a threaded opening in an enclosure or other supportive member. Additionally, the shoulder 34 provides a convenient means for limiting the extent of the advancement of the body member into such opening. Rotatably affixed to the body member 22 is a gland nut 36 having a selectively internally threaded portion 38 adjacent a first end 40 thereof, and an inturned portion 42 adjacent its other or second end 44. The interior surface of the gland nut 36 is provided with a tapered portion 46 sloping from its internally threaded portion 38 generally towards its second end 44. Interposed between the tapered portion 28 of body member 22 and the tapered portion 46 of gland nut 36 is a seal 48 formed preferably of a resilient material in the shape of a generally annular ring and proportioned to fit closely within the tapered portions 28 and 46. The body member 22 and the gland nut 36 may each be formed of either metallic material as illustrated, for example, in FIG. 1, or of a suitable plastic material as shown, for example, at 50 and 52 respectively, in FIG. 8. It of course will be readily appreciated that the metallic construction may be advantageous in those applications where it is either necessary or desirable to establish metal-to-metal contact and grounding between the coupling 20 and a further member or fitting such as 54 illustrated in FIG. 1. The arrangement shown in FIG. 8, however, may be found extremely useful where for example the parts may be subjected to an environment which may attack or be detrimental to members fabricated from metallic material but non-injurious to parts fabricated from non-metallic material. Such materials may include, for example, nylon, Delrin, PVC, or any one of the general polymers. Alternatively, the body member 22 may be fabricated in a manner shown, for example, in FIG. 9, wherein a metallic inner sleeve 56 which may be formed of steel or any one of the commonly employed electrically conducting materials such as copper, aluminum, brass, bronze or the like, is fitted within the interior of a plastic body member 58 to provide means for establishing metal-to-metal contact and grounding between member 58 and the threaded fitting or pipe 54. The arrangement shown in FIG. 9 may be further modified wherein only selective portions of the body member 58 may be provided with a plastic coating or covering. The coupling 20, although useful for many applications where it is desired for one reason or another to interpose an intermediate device between a fitting and enclosure or supportive member, will have great utility in those applications where, due to space limitations, it is either highly inconvenient or difficult to rotate or manipulate the threaded fitting or pipe to effect the desired coupling. For example, as illustrated in FIG. 2, an offset fitting such as 54 may be required to be threadably joined to an enclosure such as 62 which is affixed to a wall or other supporting device. However, the manipulation of the fitting 54 may be hampered or restricted by the presence of a protruding member such as 64 in close proximity thereto. The coupling 20 may thus be advantageously employed in the manner shown in FIGS. 1 and 2 to effect the desired assembly while obviating the need for rotating the fitting 54 to accomplish this result. As shown in detail in FIG. 1, the threaded end 60 of fitting 54 is engaged by the internally threaded portion 38 of gland nut 36 which is rotated to advance the free end 66 of fitting 54 towards the seal 48 and the tapered portion 28 of body member 22. The gland nut 36 is rotated until the front end 66 of fitting 54 is caused to contact both the tapered portion 28 of body member 22, as at 68, and the seal means 48, the latter being selectively deformed into the available space intermediate the tapered portions 28 and 46, respectively, of body member 22 and gland nut 36. The seal means 48 is thus brought in intimate contact with the surrounding or bounding surfaces of the gland nut 36, the body member 22, and the adjacent surfaces of the fitting 54, thus providing a seal thereat substantially as shown. It will be readily appreciated that the angular disposition of the tapered portion 28 may be selectively chosen to control the amount of advancement of the threaded fitting 54 into the coupling 20 and, concurrently, the amount of deformation or distortion to which the seal means 48 is subjected during this assembly. It will also be readily appreciated that the internally tapered portion 46 of gland nut 36 may be selectively arranged to co-act with the body member tapered portion 28 to effectively control the specific deformation of the seal means 48 during the assembly. Other embodiments of the tapered portions of a body member and gland nut are shown in FIGS. 5 and 6. In FIG. 5, for example, a tapered portion 70 is formed in a body member raised portion 72 and inclined oppositely to a further tapered poriton 74 extending therefrom and communicating with the inner surface 76 of the body member, thus forming a generally V-shaped annular recess. A seal 78 interposed between the tapered portions 70 and 74 of the body member and the opposing tapered portion 46 of the gland nut is thus selectively confined within the space between the gland nut and the body member and the deformation thereof advantageously controlled in such manner as to provide maximum deformation at the point of contact between the free end 66 of the fitting 54 and the seal 78 while the remaining portion of the seal 78 is subjected to a minimum of deformation while affording a secure seal against the opposing and adjacent surfaces of the assembled members. The gland nut tapered portion 46 may be modified as shown for example in FIG. 6 to provide a tapered portion 79 extending only partially towards the internally threaded portion 80 of a gland nut 82, the communication between the tapered portions 79 and the internally threaded portion 80 being provided by a surface 84 extending generally normal to the longitudinal axis of the gland nut 82. The angular relationship between the surfaces defining the body member tapered portion 28 and the gland nut tapered portion 78 is so arranged as to subject the seal 78 to forces tending to drive it further into the gap 86 between the free end 66 of the fitting 54 and the tapered portion 28 of the body member 22. The aforementioned metal-to-metal contact between the free end 66 of the fitting 54 and the body member 22 provides a convenient means for establishing a ground connection therebetween which may be necessary or desirable in those applications in which the fitting 54 is connected to an electrical conduit (not shown) and the body member 22 is fitted to an electrical junction box or enclosure.

Figure 3:
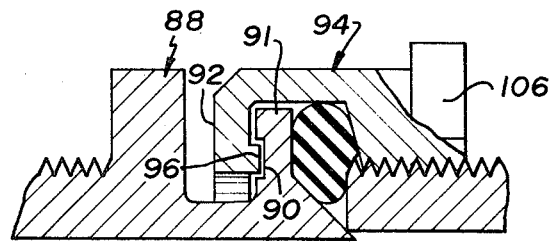
FIGS. 3 and 4 are fragmentary side elevational views, in section, of further embodiments of the gland nut and body member of the device of FIG. 1 constructed in accordance with the concepts of the invention.
Figure 4:
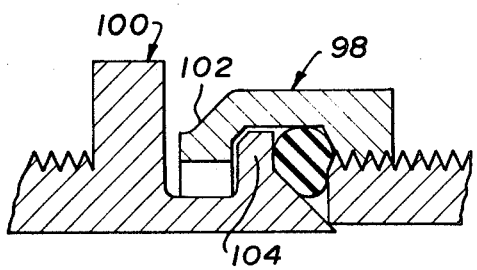

Turning now to FIGS. 3 and 4 there are shown additional embodiments useful for rotatably joining the gland nut to the body member. In FIG. 3 for example, there is shown a body member 88 having a generally annular recess 90 formed in a raised portion 91 thereof. The inturned portion 92 of a gland nut 94 is provided with a selectively formed shoulder 96 adapted to slidingly fit within the recess 90 to provide rotatable engagement therebetween, thus securing the gland nut 94 to the body member 88 while limiting the amount of radial displacement between the gland nut 94 and the body member 88. It will of course be readily apparent to those skilled in the art that the relative positions of the recess 90 and the shoulder 96 may be reversed to effect a similar result. In the arrangement shown in FIG. 4 rotatable engagement between a gland nut 98 and body member 100 is accomplished by at least partially inwardly swaging or crimping the second end 102 of the gland nut 98 generally adjacent the raised portion 104 of body member 100 substantially as shown. The configuration illustrated in FIG. 4 may be seen to be readily employable with either automatic or manually operated equipment to effect the required crimp. The embodiments illustrated in FIGS. 3 and 4 may of course be readily employed with any of the aforementioned assemblies to effect rotatable coupling between the gland nut and the body member. Other arrangements for providing rotatable coupling between the body member and gland nut will become apparent to those skilled in the art and may include, for example, adjustable screws or clamp-like fingers (not shown) extending from the gland nut inwardly just behind the raised portion of the body member.

Figure 7:
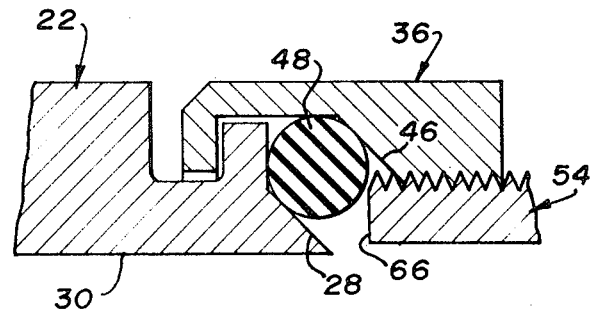
FIG. 7 is a fragmentary side elevational view, in section, of a portion of the body member and gland nut of the device of FIG. 1 partially engaged with the threaded end of a pipe or fitting.

The seal 48 may have an essentially circular cross section as shown, for example, in FIG. 7, or may be selectively contoured to conform more closely to the space defined by the opposing tapered portions of the body member and the gland nut of the coupling. In the embodiment shown in FIG. 7 a portion of the seal means 48 is illustrated as extending slightly beyond or to the right of the second end of body member 22 prior to its contact with the leading end 66 of the fitting 54, thus permitting the fitting 54 to contact the seal 48 before its advancement is restricted by its contact with the tapered portion 28 of body member 22, and thereby causing the seal 48 to be subjected to a deforming force sufficient to urge it against the adjacent surfaces of the body member 22, gland nut 36, and fitting 54 to provide the desired seal. It may thus be seen that the deformation of the seal 48 may be effectively governed and controlled by the spacing and relative angular disposition between the tapered portions 28 and 46 and the size of seal utilized in the coupling. The seal 48 may be formed of any one of a number of commonly employed, readily deformable materials such as rubber, neoprene, and the like or other natural and synthetic materials useful in those applications where resistance to oils, alkalies, acids, or other destructive chemicals may be necessary or desirable. It will be further appreciated that due to the resilient nature of the seal 48 and its ability to resume its original shape upon the removal of the deforming forces to which it may be subjected, a highly advantageous reusable coupling is thereby provided. The gland nut 36 may be provided with selectively flatted portions such as 106 shown in FIG. 3 to permit it to be more conveniently rotated and tightened or loosened either manually or by the use of an appropriately formed tool.

The embodiments of the invention in which an exclusive property or privilege is claimed are defined as follows:

1. A coupling assembly attachable to a threaded opening or the like comprising a fitting having a threaded portion adjacent a first end thereof a hollow body member having an externally threaded portion adjacent a first end thereof, a generally selectively tapered portion adjacent a second end thereof engaging the adjacent inner edge of said first end of said fitting to limit the extent of engagement therebetween, said tapered portion communicating with the interior surface of said body member at said second end thereof, a central portion intermediate said first and said second ends, and a circumferentially disposed raised portion adjacent said tapered portion, said body member tapered portion extending up to and communicating with said raised portion; a gland nut rotatively coupling said fitting to said body member said gland nut having an internally threaded portion adjacent a first end thereof, and an inturned portion adjacent a second end thereof, said inturned portion at least partially encircling said body member raised portion to provide rotatable engagement therebetween, said internally threaded portion extending at least partially beyond said body member second end and engaging said threaded portion of said fitting, said gland nut further having an inner surface having a selectively tapered portion intermediate said first and said second ends thereof, said gland nut tapered portion extending outwardly from said internally threaded portion to an inner cylindrical surface thereof intermediate said inturned portion and said tapered portion; and seal means in the form of a generally resilient, selectively proportioned annular ring disposed intermediate said body member tapered portion and said gland nut inner surface tapered portion, the surfaces defining said tapered portions and said gland nut inner cylindrical surface at least partially selectively bounding said seal means and controlling the deformation thereof, said seal means further engaging at least a portion of said first end of said fitting, the engagement of said hollow body member tapered portion with said inner edge of said fitting serving to provide a fully bounded enclosure for said seal means.

2. A coupling as defined in claim 1 wherein at least a portion of said seal means extends beyond said body member second end.

3. A coupling as defined in claim 2 wherein said body member further comprises a shoulder portion circumferentially disposed generally about said central portion thereof.

4. A coupling as defined in claim 3 wherein the periphery of said body member shoulder portion is selectively flatted to provide means for rotatably manipulating said body member.

5. A coupling as defined in claim 1 wherein said body member is formed from metallic material.

6. A coupling as defined in claim 5 wherein said gland nut is formed from metallic material.

7. A coupling as defined in claim 1 wherein the maximum spacing between the surfaces defining said body member tapered portion and said gland nut tapered portion is generally equal to the cross-sectional dimension of said seal means.

8. A coupling as defined in claim 1 wherein at least a portion of the exterior surface of said gland nut is selectively flatted to provide means for the rotatable manipulation thereof.

9. A coupling a defined in claim 1 wherein said seal means has a generally circular cross-section.

10. A coupling as defined in claim 9 wherein the maximum spacing between the surfaces defining said body member tapered portion and said gland nut tapered portion is generally equal to the cross-sectional dimension of said seal means.

11. A coupling as defined in claim 1 wherein said body member is formed from plastic material.

12. A coupling as defined in claim 11 further comprising a metallic sleeve extending co-axially within said body member and in intimate contact with at least a portion of the interior surface thereof.

13. A coupling as defined in claim 12 wherein said metallic sleeve comprises a first end communicating with said body member second end generally adjacent said tapered portion thereof.

14. A coupling as defined in claim 11 wherein said gland nut is formed from plastic material.

15. A coupling as defined in claim 14 further comprising a metallic sleeve extending co-axially within said body member and in intimate contact with at least a portion of the interior surface thereof.

16. A coupling as defined in claim 15 wherein said metallic sleeve comprises a first end communicating with said body member second end generally adjacent said tapered portion thereof.

* * * * *